United States Patent
Sewell et al.

(10) Patent No.: US 10,207,863 B2
(45) Date of Patent: *Feb. 19, 2019

(54) APPARATUS FOR SEALING A VACUUM TANK DOOR

(71) Applicant: The Charles Machine Works, Inc., Perry, OK (US)

(72) Inventors: Cody L. Sewell, Perry, OK (US); David A. Bural, Edmond, OK (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,647

(22) Filed: Nov. 13, 2017

(65) Prior Publication Data

US 2018/0072493 A1    Mar. 15, 2018

Related U.S. Application Data

(63) Continuation of application No. 14/737,240, filed on Jun. 11, 2015, now Pat. No. 9,821,953, which is a
(Continued)

(51) Int. Cl.
*E02F 3/88* (2006.01)
*A47L 5/00* (2006.01)
(Continued)

(52) U.S. Cl.
CPC ............ *B65D 90/008* (2013.01); *F16J 13/18* (2013.01); *B65D 90/623* (2013.01);
(Continued)

(58) Field of Classification Search
CPC ...... B09B 1/00; B60P 1/16; B60P 1/30; B60P 1/32; B60P 1/34; B60P 1/60;
(Continued)

(56) References Cited

U.S. PATENT DOCUMENTS 124,768 A * 3/1872 Snyder ................ B65D 50/068
220/210
187,768 A 2/1877 Munzinger
(Continued)

*Primary Examiner* — J. Gregory Pickett
*Assistant Examiner* — Gideon Weinerth
(74) *Attorney, Agent, or Firm* — Tomlinson McKinstry, P.C.

(57) ABSTRACT

An apparatus for sealing a vacuum tank door. The apparatus comprises a circular flange attached to a door panel of a vacuum tank, a horizontal crossbar connected to the center of the door panel and a lifting assembly. The lifting assembly comprises an upper linkage arm, a lower linkage arm, and a hydraulic cylinder. Activation of the hydraulic cylinder causes the linkage assembly to move downwards pulling on the horizontal crossbar and pulling the vacuum tank door towards the tank. Activation of the hydraulic cylinder also causes a connection point of the lower linkage arm and the upper linkage arm to move over-center of the connection between the lower linkage arm to the to the tank creating a tight seal between the vacuum tank door and the tank.

20 Claims, 12 Drawing Sheets

Related U.S. Application Data continuation-in-part of application No. 13/434,349, filed on Mar. 29, 2012, now Pat. No. 9,057,180.

(60) Provisional application No. 61/481,600, filed on May 2, 2011.

(51) Int. Cl.
*B65D 90/62* (2006.01)
*B65D 90/00* (2006.01)
*F16J 13/18* (2006.01)

(52) U.S. Cl.
CPC ...... *B65D 90/626* (2013.01); *B65D 2590/664* (2013.01); *E02F 3/88* (2013.01); *E02F 3/8816* (2013.01)

(58) Field of Classification Search
CPC ......... B60P 1/2245; B60P 1/28; B60P 1/1283; B60P 3/22; B60P 3/2255; B60P 3/2245; B62D 33/08; B62D 33/10; B65D 90/623; B65D 90/626; B65D 90/65; B65D 90/008; B65D 2590/664; B65D 2590/662; B60J 5/042; B60J 5/125; E01H 1/0836; E05F 1/1091; E02F 3/00; E02F 3/88; E02F 3/8816; E02F 3/925; E02F 5/108; E02F 5/003; E05Y 2900/516; E05Y 2900/531; E05Y 2900/60; E05Y 2900/602; E05Y 2900/604; F15B 15/02; F16J 13/16; F16J 13/18; F16J 13/20; F16J 13/22; Y10S 277/921; Y10S 37/905; Y10T 16/547; Y10T 292/216
USPC ................ 15/340.1, 347; 37/347, 905, 317; 49/386, 255, 205, 248, 229, 199, 240, 49/208, 253; 105/377.07, 377.08; 220/260, 211, 315, 319, 331, 582, 344, 220/244, 333; 222/164; 296/183.1, 296/183.2, 186.4; 298/11, 17 R, 17.5, 298/19 R, 19 B, 22 R, 22 J; 406/39; 414/425, 469, 471

See application file for complete search history.

(56) References Cited

U.S. PATENT DOCUMENTS

| | | | |
|---|---|---|---|
| 522,137 A | 6/1894 | Walker | |
| 1,237,290 A | 12/1918 | Golden | |
| 1,311,009 A | 7/1919 | Rinehimer | |
| 1,944,976 A | 1/1934 | Hamilton | |
| 2,264,216 A | 11/1941 | Milligan | |
| 2,352,192 A | 6/1944 | Gashe | |
| 2,556,354 A | 6/1951 | Williamson et al. | |
| 2,556,578 A * | 6/1951 | Dohm, Jr. .............. | A22C 11/02 220/262 |
| 2,584,500 A * | 2/1952 | Riordan .................. | F16J 13/20 220/324 |
| 2,639,144 A | 5/1953 | Long | |
| 2,639,601 A | 5/1953 | Miller | |
| 2,734,656 A | 2/1956 | Schonfeld | |
| 2,816,683 A | 12/1957 | Miers et al. | |
| 2,823,825 A | 2/1958 | Coffman | |
| 2,867,329 A | 1/1959 | Miller | |
| 2,927,787 A | 3/1960 | Maher | |
| 3,195,761 A | 7/1965 | Coates | |
| 3,310,329 A * | 3/1967 | Luker .................... | F16J 13/20 220/319 |
| 3,311,255 A | 3/1967 | Loveless | |
| 3,363,944 A * | 1/1968 | Lablanche ............... | B60P 1/20 298/22 J |
| 3,540,618 A | 11/1970 | Jakobsen | |
| 3,628,687 A | 12/1971 | Townsend | |
| 3,713,472 A | 1/1973 | Dozois | |
| 3,768,203 A | 10/1973 | Bellucci | |
| 3,841,676 A | 10/1974 | Hover | |
| 3,860,142 A | 1/1975 | Jurges | |
| 3,888,045 A | 6/1975 | Piegza | |
| 3,924,778 A | 12/1975 | Sorensen | |
| 3,930,324 A * | 1/1976 | Wightman ............ | E02F 3/8825 37/189 |
| 4,017,281 A | 4/1977 | Johnstone | |
| 4,119,238 A | 10/1978 | Ja'afar et al. | |
| 4,135,640 A | 1/1979 | MacQuilkin et al. | |
| 4,155,586 A | 5/1979 | Flynn | |
| 4,199,837 A | 4/1980 | Fisco, Jr. | |
| 4,222,404 A | 9/1980 | Flynn | |
| 4,307,541 A | 12/1981 | Farmer et al. | |
| 4,334,633 A | 6/1982 | Piegza | |
| 4,518,095 A | 5/1985 | Engwert | |
| 4,566,375 A | 1/1986 | van der Schoot | |
| 4,644,874 A | 2/1987 | Kleykamp | |
| 4,669,628 A | 6/1987 | Hatta | |
| 4,690,070 A | 9/1987 | Miller | |
| 4,922,571 A | 5/1990 | Driear | |
| 4,935,984 A * | 6/1990 | Bryant ..................... | E03F 7/10 134/167 C |
| 5,016,717 A | 5/1991 | Simons et al. | |
| 5,021,156 A | 6/1991 | Sloan | |
| 5,092,963 A | 3/1992 | Barker et al. | |
| 5,103,592 A | 4/1992 | Janitzky | |
| 5,141,528 A | 8/1992 | Boczkiewiez et al. | |
| 5,191,993 A | 3/1993 | Wanger et al. | |
| 5,299,370 A | 4/1994 | Gyori et al. | |
| 5,366,317 A | 11/1994 | Solimar | |
| 5,394,650 A | 3/1995 | Dean | |
| 5,596,788 A | 1/1997 | Linville et al. | |
| 5,700,043 A | 12/1997 | Rohard et al. | |
| 5,718,017 A * | 2/1998 | Pavlick ................. | B65F 3/0209 15/340.1 |
| 5,791,073 A | 8/1998 | Palmer et al. | |
| 5,840,102 A * | 11/1998 | McCracken ......... | B01D 46/002 95/268 |
| 5,919,421 A | 7/1999 | Monz et al. | |
| 5,937,581 A | 8/1999 | Matye et al. | |
| 5,960,980 A | 10/1999 | Burke et al. | |
| 5,996,171 A * | 12/1999 | Bowers ................ | B01D 46/002 15/340.1 |
| 6,007,270 A | 12/1999 | Bowman | |
| 6,050,199 A | 4/2000 | Anderson et al. | |
| 6,055,775 A | 5/2000 | Dering et al. | |
| 6,109,823 A | 8/2000 | Halferty et al. | |
| 6,182,952 B1 | 2/2001 | Gutierrez | |
| 6,293,051 B1 | 9/2001 | Matye | |
| 6,385,867 B1 | 5/2002 | Slabach et al. | |
| 6,386,598 B1 | 5/2002 | Dykstra et al. | |
| 6,391,258 B1 | 5/2002 | Peake et al. | |
| 6,438,792 B1 | 8/2002 | Cappellotto | |
| 6,470,605 B1 | 10/2002 | Gilman et al. | |
| 6,615,849 B1 | 9/2003 | Gilman et al. | |
| 6,966,724 B2 | 11/2005 | Robinson | |
| 7,255,039 B2 | 8/2007 | Halliday et al. | |
| 7,451,521 B2 | 11/2008 | Cappellotto | |
| 7,712,181 B2 | 5/2010 | Riach | |
| 7,802,694 B2 | 9/2010 | Lee | |
| 7,837,050 B2 | 11/2010 | Maybury, Jr. | |
| 8,066,140 B1 | 11/2011 | Young et al. | |
| 8,297,463 B2 | 10/2012 | McQuaid et al. | |
| 8,360,260 B2 | 1/2013 | Maybury, Jr. | |
| 8,540,103 B2 | 9/2013 | Lollis et al. | |
| 8,596,697 B1 | 12/2013 | Haibel | |
| 8,667,717 B2 | 3/2014 | Maybury et al. | |
| 8,802,023 B1 | 8/2014 | Lewis et al. | |
| 8,925,753 B2 | 1/2015 | Maybury, Jr. | |
| 8,997,307 B2 * | 4/2015 | Raiche ................. | A01D 51/007 15/320 |
| 9,057,180 B1 | 6/2015 | Sewell | |
| 9,394,731 B2 * | 7/2016 | Buckner ............... | E05B 65/001 |
| 2002/0000748 A1 | 1/2002 | Fuller et al. | |
| 2002/0088086 A1 * | 7/2002 | Ray ....................... | E05D 3/022 16/280 |

(56) References Cited

U.S. PATENT DOCUMENTS

| | | | |
|---|---|---|---|
| 2003/0172687 A1* | 9/2003 | Bartalucci | D06B 23/10 68/4 |
| 2004/0108317 A1 | 6/2004 | Buckner | |
| 2005/0264144 A1* | 12/2005 | Verbeek | E05D 15/46 312/323 |
| 2006/0236499 A1* | 10/2006 | Cappellotto | B60P 1/34 15/340.1 |
| 2008/0028688 A1 | 2/2008 | Neuber | |
| 2008/0083143 A1* | 4/2008 | Maybury | E02F 3/8816 37/317 |
| 2008/0244859 A1* | 10/2008 | Maybury | E02F 3/8816 15/340.2 |
| 2008/0257888 A1* | 10/2008 | Lee | B01J 3/03 220/324 |
| 2009/0081091 A1* | 3/2009 | Lee | B01J 3/03 422/307 |
| 2010/0064649 A1 | 3/2010 | Harada et al. | |
| 2010/0320204 A1 | 12/2010 | Maybury, Jr. | |
| 2010/0325481 A1 | 12/2010 | Dahan et al. | |
| 2010/0326481 A1* | 12/2010 | Buckner | E02F 3/384 134/166 C |
| 2011/0031801 A1* | 2/2011 | Malatesta | B60P 3/2205 298/17 B |
| 2011/0107548 A1 | 5/2011 | Maybury, Jr. | |
| 2011/0192848 A1* | 8/2011 | Lollis | F16J 13/08 220/327 |
| 2011/0233986 A1* | 9/2011 | Obermeyer | B60P 1/28 298/22 R |
| 2011/0296646 A1 | 12/2011 | Showley | |
| 2013/0097933 A1 | 4/2013 | Royer et al. | |
| 2013/0189060 A1* | 7/2013 | Lamonte | E02F 3/8825 414/507 |
| 2014/0010603 A1* | 1/2014 | Blais | B60P 1/60 406/39 |
| 2014/0017018 A1* | 1/2014 | Blais | E01H 1/0836 406/39 |
| 2014/0165326 A1* | 6/2014 | Tacke | E01H 1/0836 15/340.1 |
| 2014/0353999 A1* | 12/2014 | Yielding | B60P 1/56 296/24.3 |
| 2015/0037124 A1* | 2/2015 | Longagna | B66C 1/101 414/425 |
| 2015/0274057 A1* | 10/2015 | Hinde | B60P 1/162 298/22 R |
| 2015/0291350 A1 | 10/2015 | Sewell et al. | |
| 2015/0308574 A1 | 10/2015 | Kegler | |
| 2016/0362232 A1* | 12/2016 | Sewell | B01J 3/03 |
| 2017/0292306 A1* | 10/2017 | Sewell | E05F 1/1091 |
| 2018/0104622 A1* | 4/2018 | Dawson | B01D 21/10 |

\* cited by examiner

APPARATUS FOR SEALING A VACUUM TANK DOOR

FIELD

This invention relates generally to the field of vacuum tanks, and in particular to a method or apparatus for sealing a vacuum tank in a vacuum system.

SUMMARY

The present invention is directed to a sealing mechanism for sealing a vacuum tank. The sealing mechanism comprises a circular door, a first brace, a second brace, a first bracket, and a second bracket. The circular door has an inner surface and an outer surface. The first brace is connected to the inner surface and spaced apart from a diameter of the door. The second brace is connected to the inner surface and orthogonally disposed relative to the first brace. The first bracket and second bracket are connected to the outer surface of the door. A first linkage assembly is connected to the first bracket and a second linkage assembly is connected to the second bracket. A first actuator is connected to the first linkage assembly and a second actuator is connected to the second linkage assembly. The first and second actuator are connected to operate jointly to cause the first linkage assembly and the second linkage assembly to open or close the door in relation to the vacuum tank.

The invention is also directed to a sealing mechanism for sealing a vacuum tank door comprises a circular dome shaped door having a diameter and an apex, a first brace, and a second brace. The first brace is connected to an inner surface of the door and spaced apart from the apex. The second brace is connected to the inner surface of the door and disposed to cross the first brace at a right angle to the first brace. A plurality of brackets are connected to an outer surface of the door and spaced apart from the apex. A lifting assembly is attached to one of the plurality of brackets. The lifting assembly comprises an upper linkage arm, a lower linkage arm, and a hydraulic cylinder. The upper linkage arm is connected to one of the plurality of brackets. The lower linkage arm is connected to the tank. The hydraulic cylinder is connected to the lower linkage arm.

Further, the present invention is directed to a vacuum system comprising a tank having an open end and a closed end, a door used to close the open end of the tank, and a door lifting assembly. The door has on outer surface, an inner surface, and a diameter. A first brace and a third brace are connected to the inner surface of the door. The first brace and the third brace are parallel to each other and spaced apart on opposing sides of the diameter. A second brace and a fourth brace are connected to the inner surface of the door. The second brace and the fourth brace are parallel to each other and spaced apart on opposing sides of the center of the door. The second brace and the fourth brace are disposed at a right angle to the first brace and the third brace. A plurality of brackets are connected to the outer surface of the door. The door lifting assembly comprises an upper linkage arm, a lower linkage arm, and a hydraulic cylinder. The upper linkage arm is connected to one of the plurality of brackets. The lower linkage arm has a first end and a second end and comprises a connection point disposed between the first end and the second end. The lower linkage arm is connected to a side of the tank at the connection point The hydraulic cylinder is connected to the second end of the lower linkage arm. Activation of the hydraulic cylinder causes a connection of the lower linkage arm and the upper linkage arm to move over-center of the connection point.

Further still, the invention is directed to a door assembly used to seal a vacuum tank. The assembly comprises a door having a diameter and a center, a first brace, a second brace, a third brace, a fourth brace, a plurality of brackets, and a hinge. The first brace is connected to an inner surface of the door and spaced apart from the diameter of the door. The second brace is connected to the inner surface of the door and disposed to cross the first brace at a right angle to the first brace. The second brace is spaced apart from the diameter of the door. The third brace is connected to the inner surface of the door parallel to the first brace and disposed on an opposite side of the diameter from the first brace. The fourth brace is connected to the inner surface of the door and disposed to cross both the first brace and the third brace at a right angle to the first brace and the third brace. The fourth brace is spaced apart from the diameter of the door. The plurality of brackets are connected to an outer surface of the door along the diameter at a periphery of the door. The brackets are operatively connectable to a door movement assembly. A hinge is supported at a top of the door to allow pivotal movement of the door relative to the vacuum tank.

FIG, 10 is a perspective view of a vacuum system having an alternative tank closing and sealing system.

Figure 10:
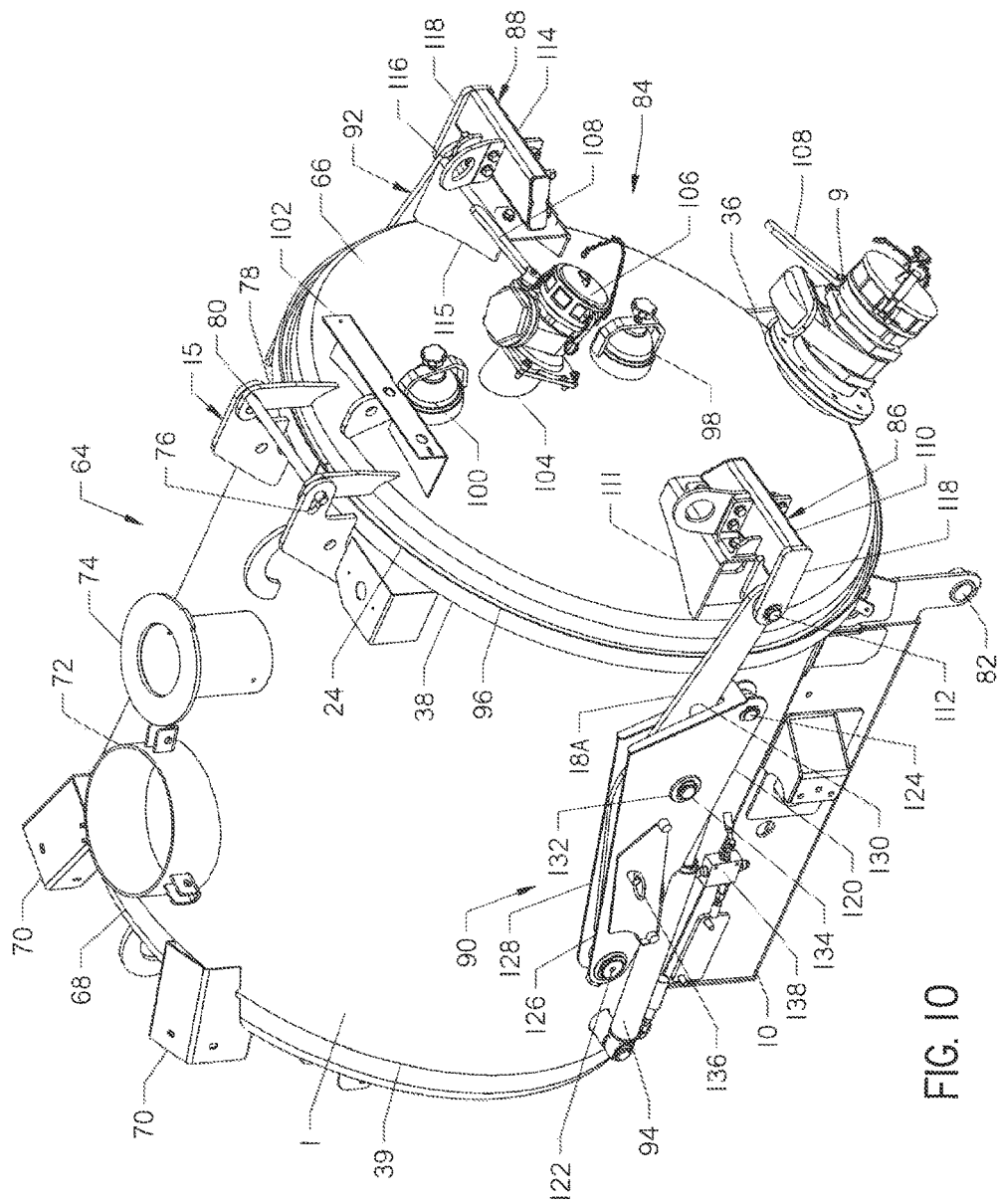
Figure 11:
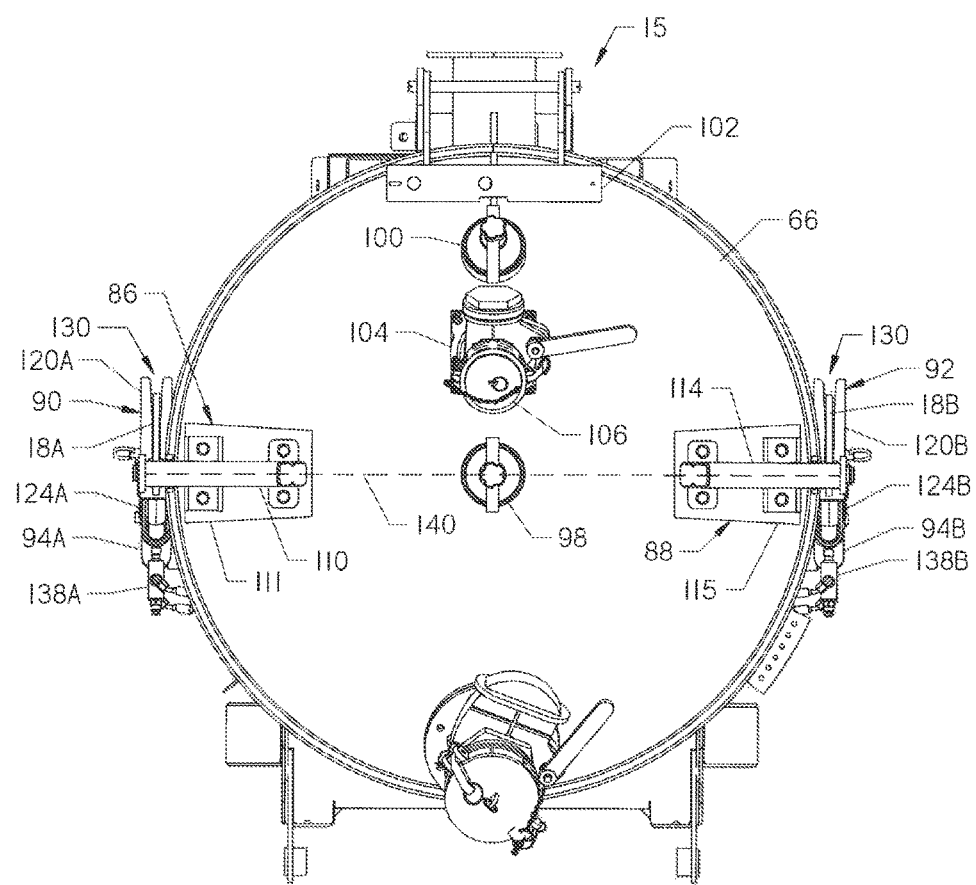

FIG. 11 is a front view of the vacuum system shown in FIG. 10.

Figure 12:
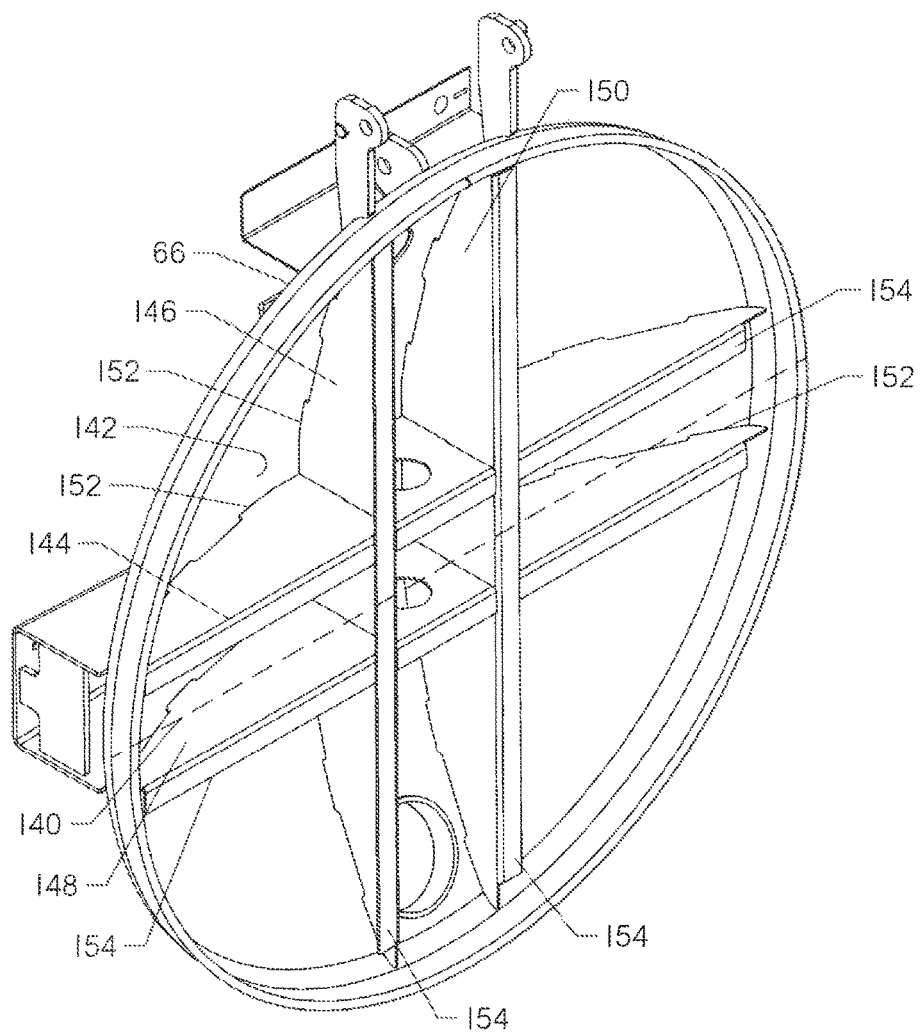

FIG. 12 is a perspective view of a door useable with the vacuum systems disclosed herein.

DETAILED DESCRIPTION

Figure 1:
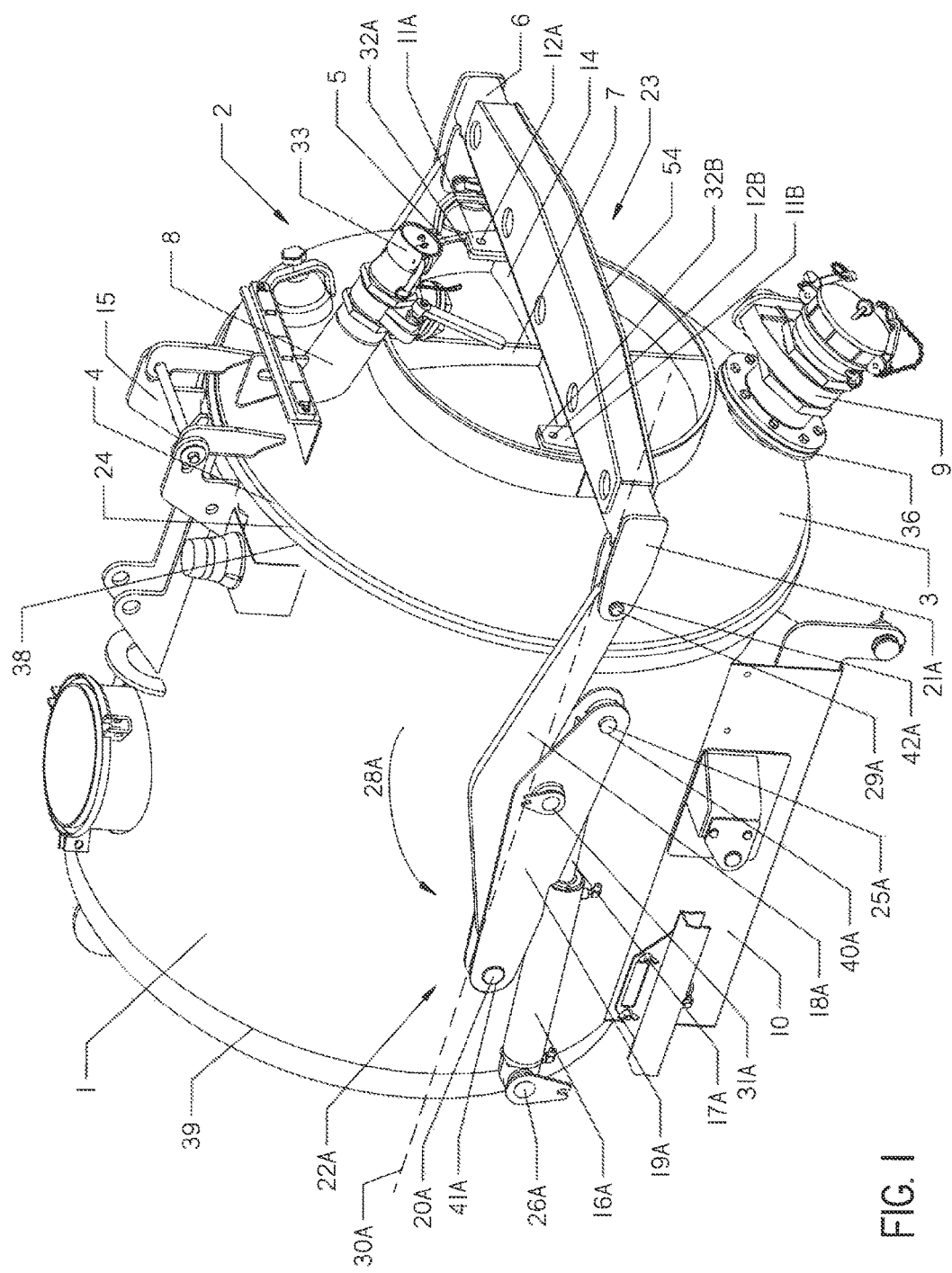
FIG. 1 is a perspective view of the vacuum tank and the closed vacuum tank door. A tank door sealing mechanism is shown attached to the tank door along with a door lifting assembly attached on one side of the tank (an identical attachment exists on the opposite side) to open and close the door.

Turning now to the figures and first to FIG. 1, a vacuum tank 1 is shown that is typically used in combination with other apparatuses to form a vacuum system. FIG. 1 shows the vacuum tank 1 and the systems and methods for sealing the tank door 2 to the tank. The vacuum tank 1 is generally cylindrical, having a first end 38 and a second end 39. The first end 38 of the vacuum tank 1 is generally open-ended and comprises a sealing flange 24 adapted to mate with the tank door 2 when the tank door is engaged with the vacuum tank 1. The second end 39 of the vacuum tank 1 is generally closed at all times. It will, however, be appreciated that the second end 39 of the vacuum tank 1 may support a second tank door (not shown) thus allowing for easy access to the inside of the second end 39 of the vacuum tank 1.

Referring still to FIG. 1, the vacuum tank 1 is shown resting on a mounting bracket 10 which is used in part to keep the tank 1 stable. The vacuum tank 1 may sit on the mounting bracket 10 on a trailer (not shown) in order to transport the vacuum tank 1 to various locations. The mounting bracket 10 is adapted to pivotally connect the tank 1 to a trailer (not shown) so that the tank 1 may be pivoted upward to allow for dumping of the contents contained therein. A hydraulic lifting assembly 50 (FIG. 5) may be disposed under the vacuum tank 1 and adapted to tilt the second end 39 of the vacuum tank 1 upward to facilitate dumping of the contents.

FIG. 1 shows the vacuum tank door 2 in a closed and sealed position. A sealing mechanism 23, used to seal the door shut, is shown on the face of the tank door 2. The sealing mechanism 23 works to evenly distribute the force placed on the door 2 when the door is in the closed position. Even distribution of the force upon the door ensures an even seal around the periphery of the door 2 and prevents any dimpling or deforming of the door that would compromise the seal. The sealing mechanism 23 comprises a circular flange 5, a vertical bar 7, a horizontal bar 14, and a horizontal crossbar 6. The circular flange 5 may be attached to the face of the door panel 3 such that the ring is evenly spaced from the outer edge of the door panel. The vertical bar 7 and the horizontal bar 14 span the inner diameters of the circular flange 5. The vertical bar 7 and the horizontal bar 14 rigidly attach to the interior of the circular flange 5 to provide structural support to the flange.

Figure 3:
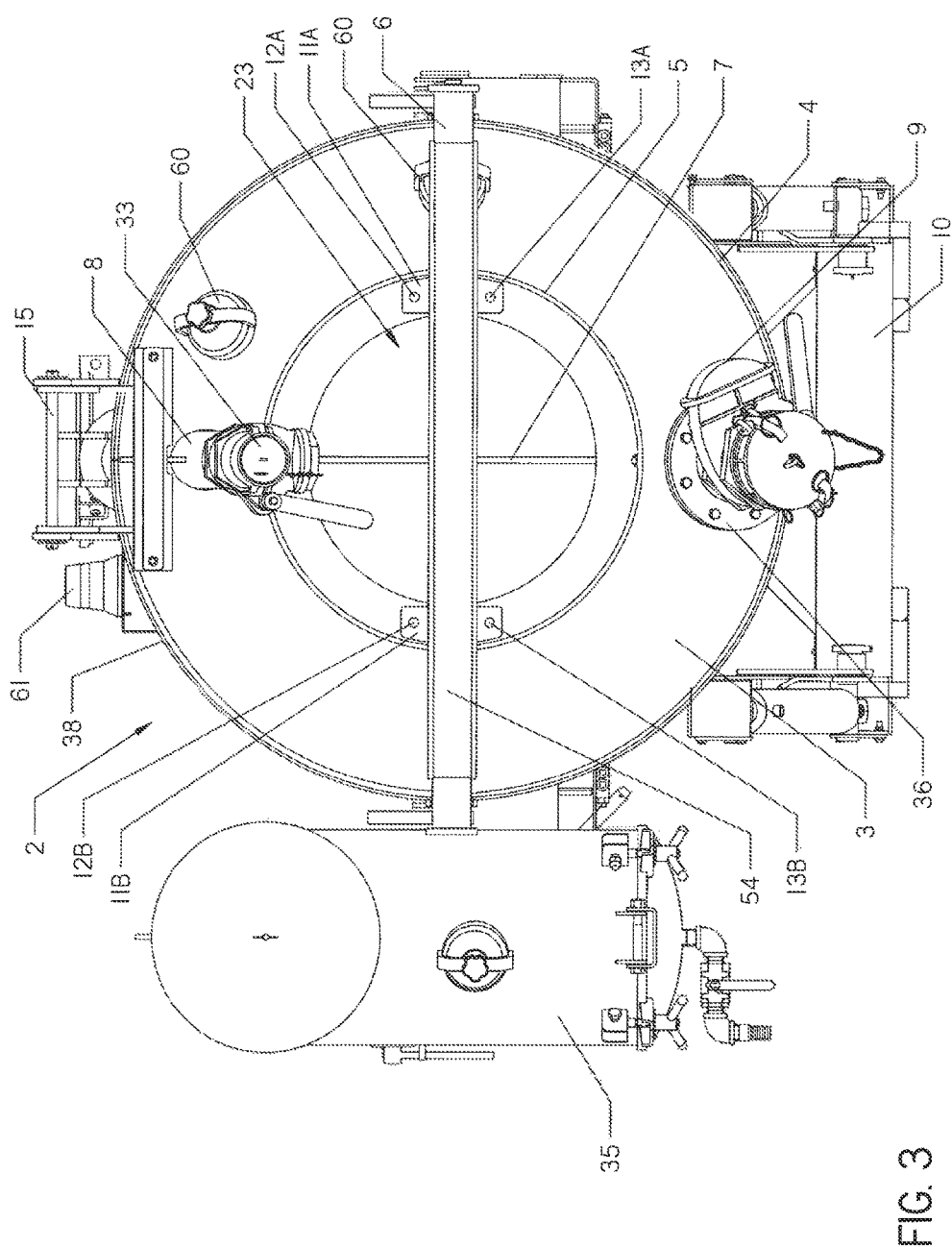
FIG. 3 is a front view of vacuum tank and door of FIG. 1. The door sealing mechanism is shown attached to the tank door. A sediment collector tank is also shown attached to the side of the vacuum tank.

The horizontal crossbar 6 spans the diameter of the circular flange 5 and the tank door 2 as shown in FIGS. 1 and 3. A horizontal crossbar brace 54 covers the crossbar 6 to provide further support. The horizontal crossbar 6 rests directly over the horizontal bar 14 but, as shown in FIG. 1, it may be positioned so it does not touch the horizontal cross bar. The horizontal crossbar 6 connects to the circular flange 5 via brackets 11A, 11B, 32A, and 32B. The brackets 11A and 11B are welded to the horizontal crossbar 6. Brackets 32A and 32B are welded to the interior edges of the circular flange 5 just above the horizontal bar 14. The horizontal crossbar 6 attaches to the circular flange 5 via bolting brackets 11A and 32A together and bolting brackets 11B and 32B together. FIG. 3 shows bolts 12A and 12B connecting the top halves of brackets 11A, 11B, 32A, and 32B together as well as showing bolts 13A and 13B connect the bottom halves of brackets 11A, 11B, 32A, and 32B together. Brackets 32A and 32B are only visible in FIG. 1.

Figure 6:
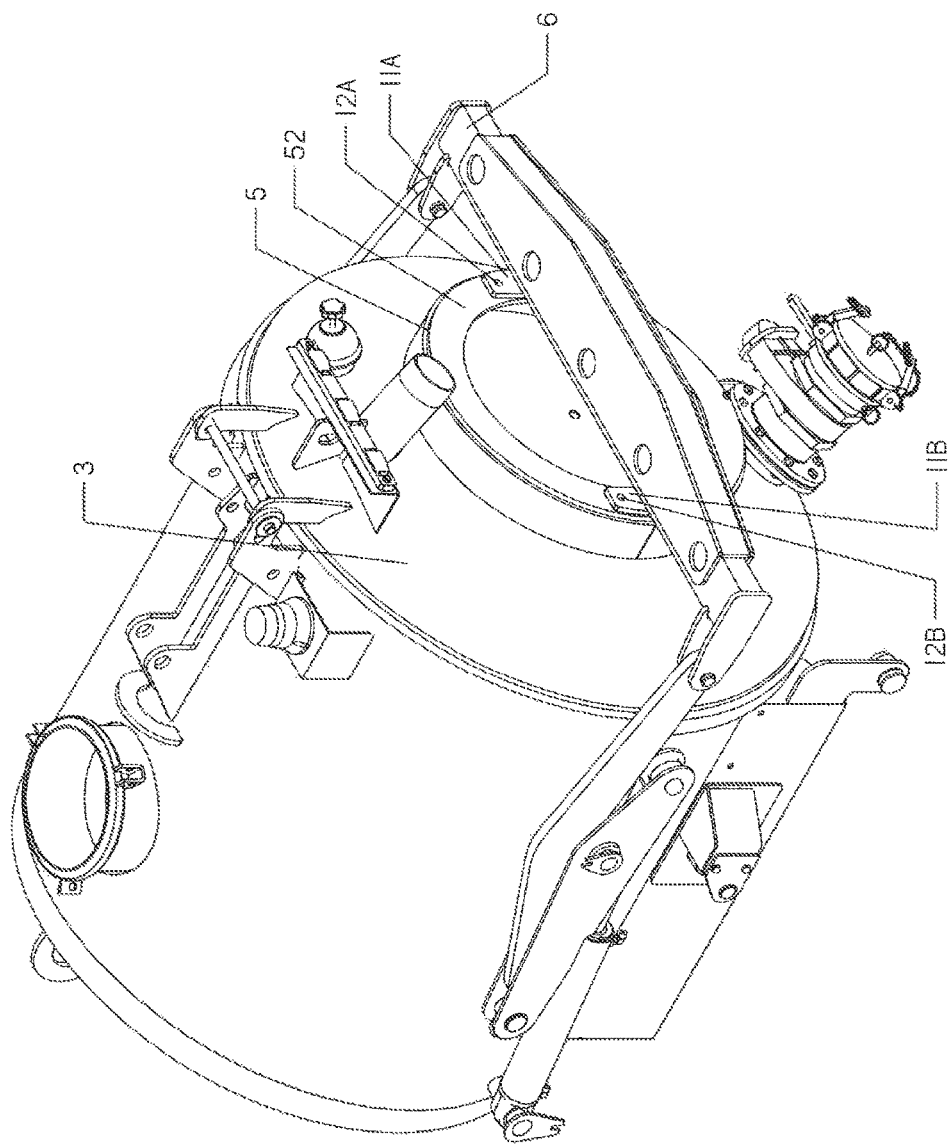
FIG. 6 is a perspective view of the vacuum tank and the closed vacuum tank door with an alternative embodiment of the door sealing mechanism shown in FIG. 1.
Figure 7:
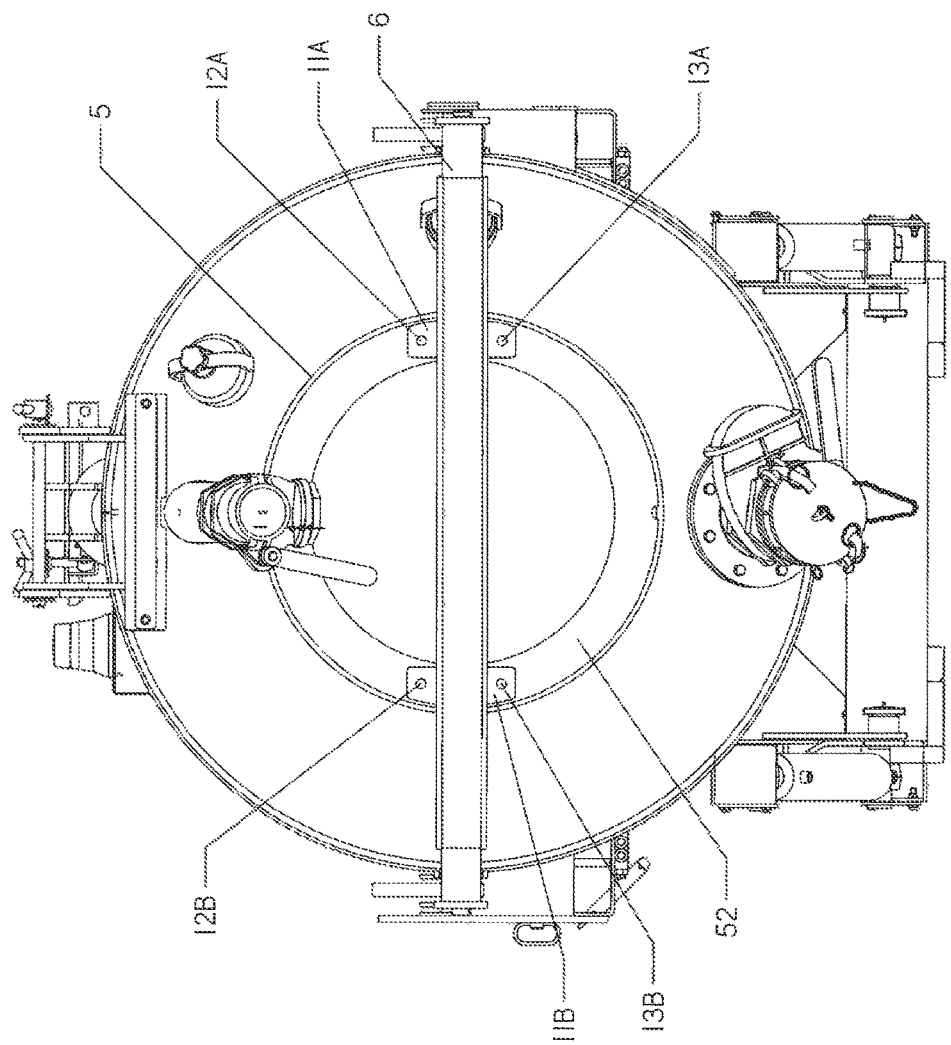
FIG. 7 is a front view of the embodiment of the vacuum tank door shown in FIG. 6.

As shown in FIG. 6, a center circular flange lip 52 may be attached to the circular flange 5 in place of the vertical bar 7 and horizontal bar 14 of FIG. 1. The lip 52 is welded to the top of the circular flange 5 matching the flange's circumference and projects inward. The horizontal crossbar 6 connects to the surface of the circular flange lip 52 on opposite sides via brackets 11A and 11B. Brackets 11A arid 11B connect to the outer surface of the lip 52 via bolts 12A and 12B, The brackets are also connected underneath the horizontal crossbar 6 to the lip 52 via bolts 13A and 13B as shown in FIG. 7. The space in the center of the circular flange 5 and the underneath the lip of the flange 52 is completely open exposing the surface of the door panel 3 as seen in FIG. 6.

Figure 8:
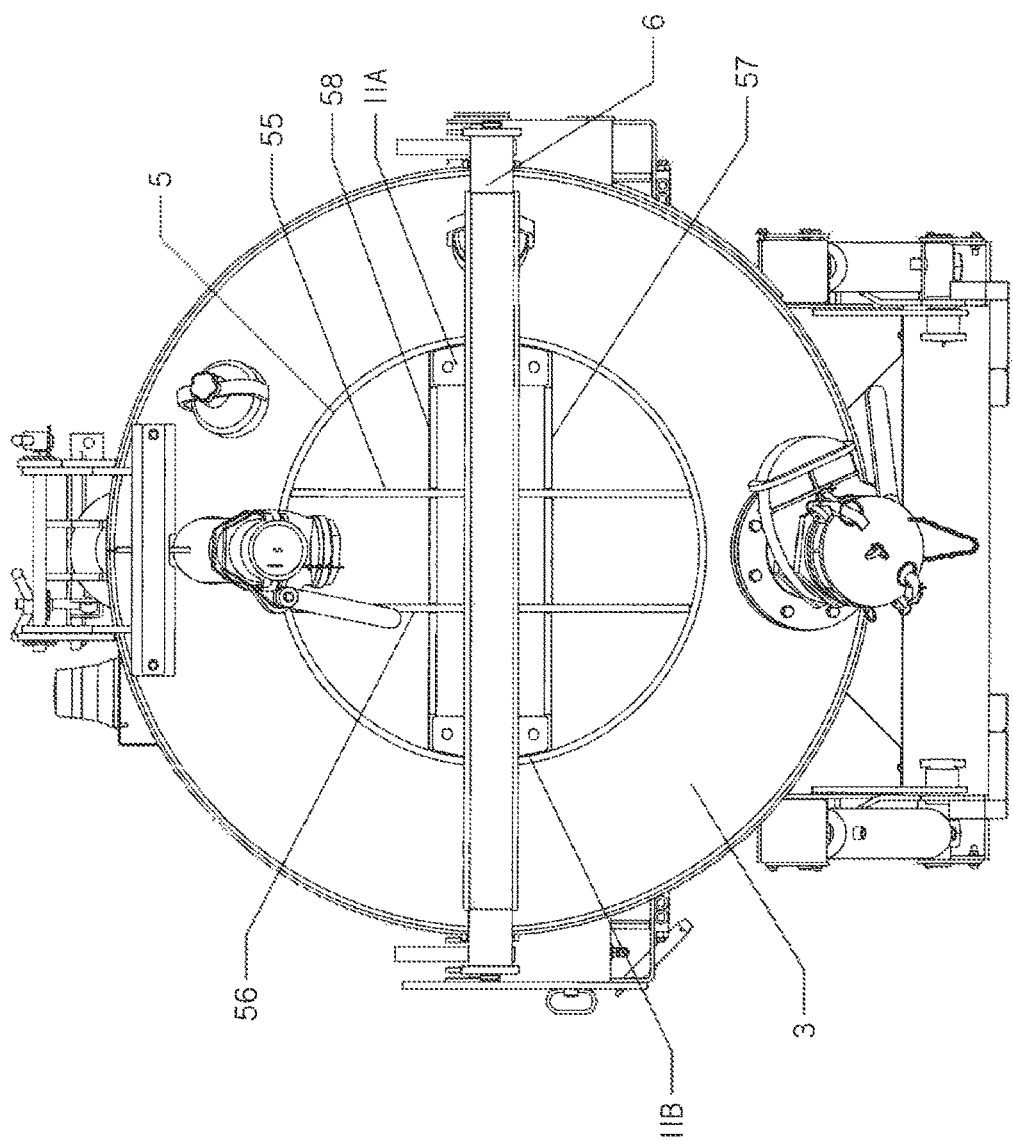
FIG. 8 is a front view of an alternative embodiment of the vacuum tank door shown in FIG. 1.
Figure 9:
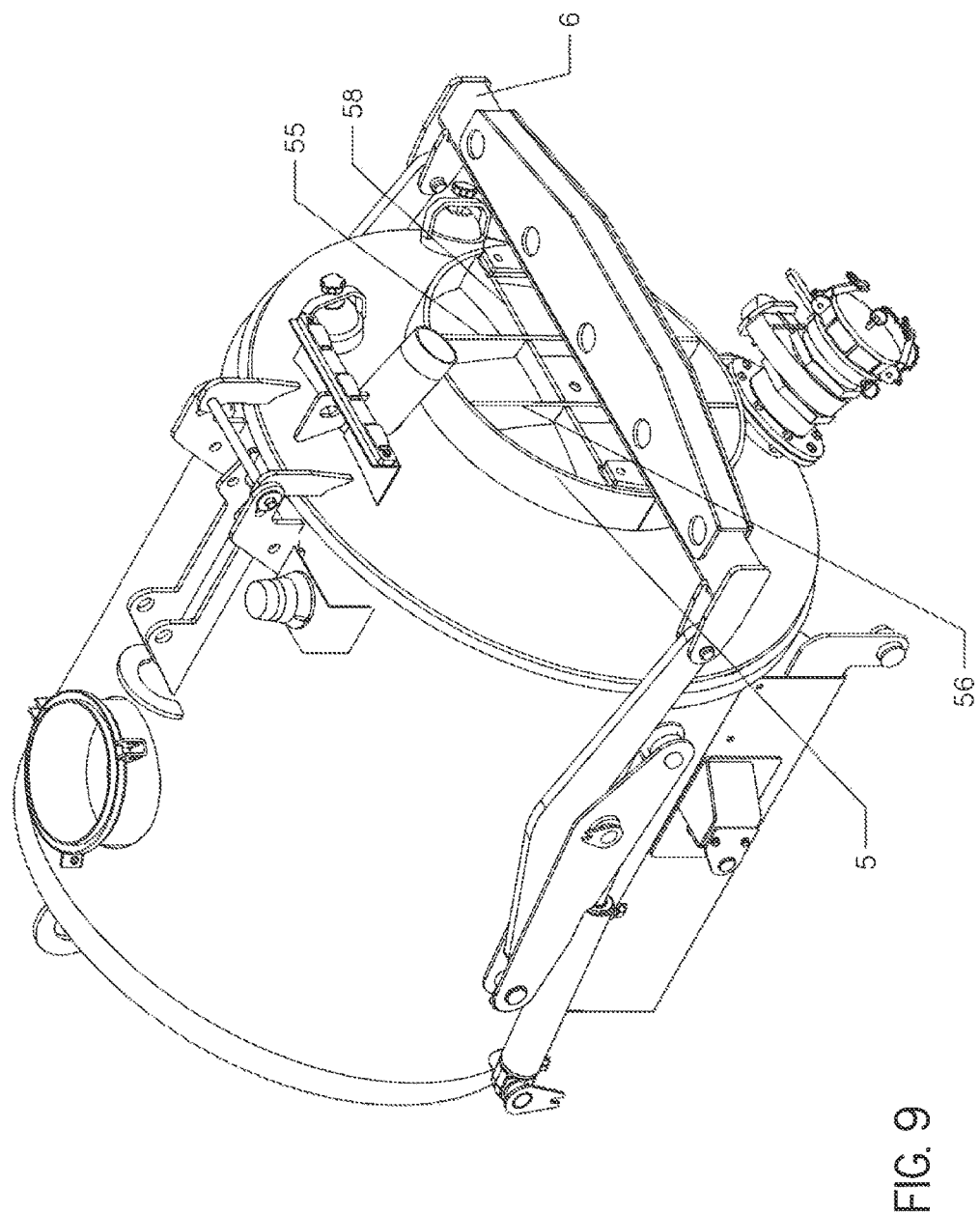
FIG. 9 is a perspective view of the vacuum tank and the closed vacuum tank door of FIG. 8.

Turning to FIGS. 8 and 9, an alternative embodiment of the tank door sealing mechanism is shown. The embodiment of FIGS. 8 and 9 utilizes two vertical bars 55 and 56 and two horizontal bars 57 and 58. Horizontal bars 57 arid 58 are made of three pieces each and extend across the door within the circular flange 5. The horizontal cross bars 57 and 58 are welded to the inside of the circular flange 5. Brackets 11A and 11B are welded to the horizontal bars 57 and 58 and provide attachment points for the cross bar 6. Vertical bars 55 and 56 extend inside the diameter of the circular flange 5 across the horizontal bars 57 and 58.

Connecting the horizontal crossbar 6 to the tank door 2 in two places, as shown in FIGS. 1, 6, and 8, works to ensure an even seal around the periphery of the door. When the tank door 2 is in the closed position, the horizontal crossbar 6 exerts pressure on the tank door. By connecting the horizontal crossbar 6 to the tank door 2 in two different places on the circular flange 5, the pressure exerted on the tank door 2 remains balanced around the door ensuring the integrity of the tank door 2 and seal when the tank door 2 is closed.

Figure 2:
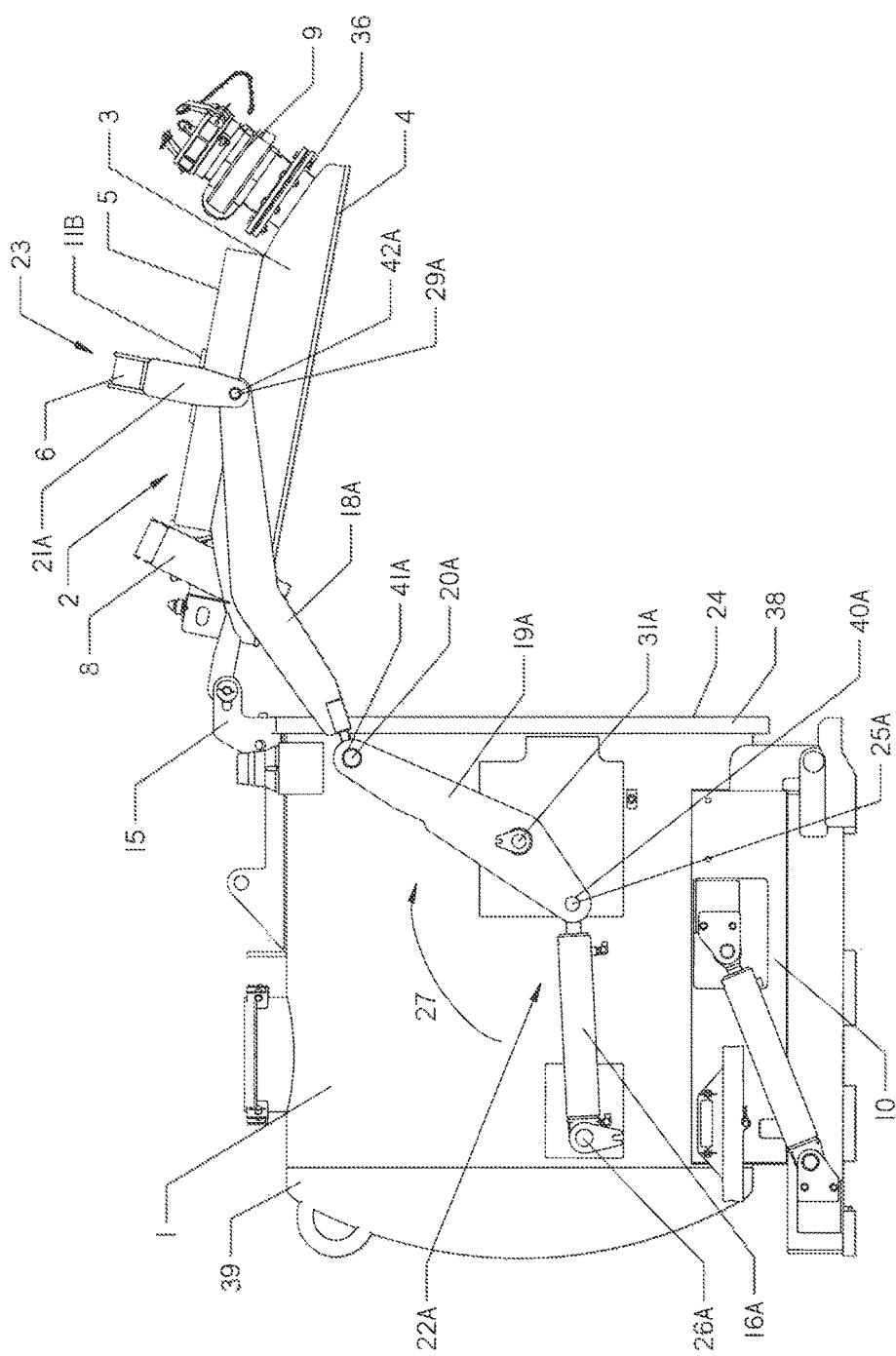
FIG. 2 is a side view of the vacuum tank and tank door of FIG. 1. The tank door is shown completely open. The door lifting assembly is shown completely extended and functioning to hold the door in an open position.
Figure 5:
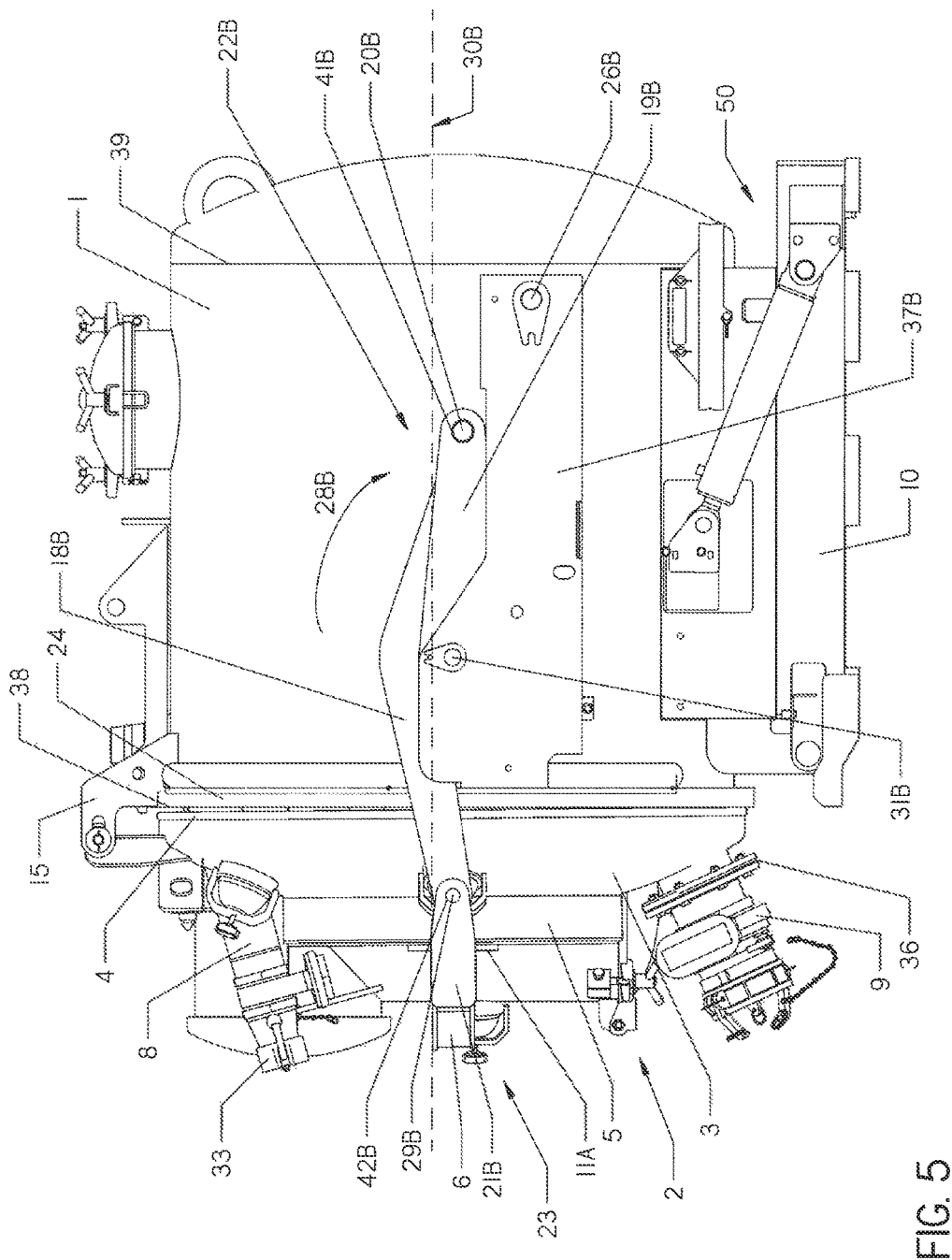
FIG. 5 is a side view of the opposite side of the vacuum tank shown in FIG. 4. The vacuum tank is shown resting on a mounting bracket and the door lifting assembly is shown in its compacted position holding the door against the tank. A hydraulic lifting assembly is also shown attached to the mounting bracket.

Pressure is exerted on the horizontal crossbar 6 by the lifting assembly 22A seen in FIG. 1, which connects to both ends of the horizontal crossbar 6 next to the outer edges of the tank door 2. The lifting assembly 22A, as shown in FIG. 2, facilitates hydraulic raising and lowering of the tank door 2. The lifting assembly 22A comprises a cylinder 16A, a piston 17A, an upper linkage arm 18A, a lower linkage arm 19A, a crossbar linkage arm 21A, pivot pins or connection points 20A, 25A, and 29A, and rotating pin 31A. The lifting assembly 22A is shown in the closed locked position functioning to seal the tank door 2 shut in FIG. 1. An identical lifting assembly 22B may be positioned on the opposite side of vacuum tank 1 as shown in FIG. 5. One skilled in the art will recognize that the lifting assembly 22B (FIG. 5) functions identical to the lifting assembly 22A as described with reference to FIGS. 1 and 2. Lifting assembly 22A and 22B work simultaneously to open and close the tank door 2. The tank door also has a discharge door sealing flange 4 that meets the vacuum tank sealing flange 24 when the door is in the closed and sealed position to help ensure a tight seal. The vacuum tank sealing flange 24 is attached to the vacuum tank 1. A gasket or rubber seal (not shown) may be attached to either flange to make the seal air tight.

In reference to FIG. 2, cylinder 16A, within the lifting assembly 22A, is rigidly mounted to the vacuum tank 1 via a cylinder mounting hole 26A, The cylinder 16A houses a piston 17A, shown in FIG. 1, which is attached via pivot pin 25A to the lower linkage arm 19A, Tire lower linkage arm 19A attaches to the upper linkage arm 18A via pivot pin 20A. The upper linkage arm 18A is then attached to the crossbar linkage arm 21A via pivot pin 29A. The upper, lower, and crossbar linkage arms 18A, 19A, and 21A and piston 17A contain holes 40A, 41A, and 42A for accepting these pivot pins. The crossbar linkage arm 21A is rigidly attached to the horizontal crossbar 6. The lower linkage arm 19A is also attached to the vacuum tank 1 via a rotating pin 31A which is welded to the side of the vacuum tank 1.

In operation, the hydraulic cylinder 16A is at a starting position when the piston 17A is extended out of the cylinder 16A, as shown in FIG. 1, and the tank door 2 is closed. When the hydraulic cylinder 16A has been pressurized using hydraulic fluid to retract the piston 17A into the cylinder 16A, as shown in FIG. 2, the lower linkage arm 19A extends upwards in direction of the arrow 27, When the piston 17A forces the lower linkage arm 19A to extend upwards, the upper linkage arm 18A extends upwards as well forcing the tank door 2 open. The tank door 2 is connected to the top of the vacuum tank 1 via a hinge 15. The tank door 2 extends out from the top of the vacuum tank 1 at the hinge 15 when the tank door 2 is fully opened. Full extension of the linkage arms exposes the interior of the vacuum tank.

To close the tank door 2, the hydraulic cylinder 16A is pressurized so that the piston 17A extends from the cylinder 16A causing the lower linkage arm 19A to fold backwards about pivot pin 31A in the direction of arrow 28A in FIG. 1. As the lower linkage arm 19A begins to fold backwards, the upper linkage arm 18A collapses forward at pivot pin 20A, in the direction of arrow 27 in FIG. 2. Upper linkage arm 18A collapses forward until it comes to rest directly on top of the lower linkage arm 19A as shown in FIG. 1. This forward movement also causes the upper linkage arm 18A to rotate around pivot pin 29A as it pulls the tank door 2 back to a closed position. When the upper and lower linkage arms 18A and 19A are completely folded, the tank door is sealed and the upper linkage arm 18A sits substantially parallel to the crossbar linkage arm 21A. The lower linkage arm 19A extends and retracts to initiate the opening and closing of the tank door 2 all while rotating around the rotating pin 31A.

FIG. 1 also demonstrates how the lower linkage arm 19A and upper linkage arm 18A fold at pivot pin 20A to rest "over-center" in regards to horizontal line 30A (also shown in FIG. 4) when the tank door 2 is closed. In this position, the linkage biases the tank door 2 in the closed position should the cylinders 16A and 16B fail. Because pivot points 20A and 20B are folded and rotated beyond over-center, lower linkage arms 19A and 19B cannot rotate or extend in a direction opposite arrows 28A (FIGS. 1 & 4) and 28B (FIG. 5) unless they are actively biased in those directions to a point above horizontal line 30A (FIGS. 4) and 30B (FIG. 5). As a result, in this position, the door is considered sealed since an active force is required to force the linkage arms back over-center and into the open position.

The lifting assemblies 22A and 22B respond identically at substantially the same time to fold and rotate the linkage arms over-center to close the door 2. Together, the assemblies force the tank door 2 against the vacuum tank 1 by applying a load upon the tank door 2 that is opposed only by forcing the linkage arms back over-center. The cylinder is shown in FIGS. 1, 2, 4, and 5 as being mounted horizontally to the side of the vacuum tank 1; however, one skilled in the art would appreciate that this cylinder may also be mounted in a more vertical position closer to the tank door 2 because this position still allows the lifting assembly 22A and 22B to rotate to over-center.

Turning now to FIG. 3, a front view of the sealed tank is shown. FIG. 3 illustrates the position of the brackets 11A and 11B with regard to the horizontal crossbar 6. FIG. 3 also shows a collection tank inlet 8 positioned just above the vertical bar 7 outside of the center circular flange 5, When a vacuum is produced in vacuum tank 1, a vacuum air stream may be pulled through the vacuum tank inlet 8. When inlet 8 is riot closed off by a plug 33, the inlet may be connected to a hose (not shown) leading to digging tools (not shown). One skilled in the art will also recognize that the vacuum tank inlet 8 may also be placed on either side of the vacuum tank 1. Placing the vacuum tank inlet 8 on the face of the tank door 2 may provide for less expensive repair of the inlet 8 by only having to fix the tank door 2 rather than the entire vacuum tank 1. FIG. 3 also shows two sight eyes 60 on the tank door which allow the operator to view the level of fluid within the tank. A safety strobe light 61 is also shown at the top of the tank.

FIG. 3, as well as FIGS. 1, 2, 4, and 5, show a flange 36 on the face of the tank door 2. The flange 36 supports a gate valve 9 to allow draining of the liquid portion of the slurry in the vacuum tank 1 without requiring the door to be opened. Gate valve 9 may also be used to introduce air into the vacuum tank 1 to reduce the vacuum in the tank so that the door may be opened. A sediment collector 35 is also shown in FIG. 3 attached to the side of the vacuum tank 1. The sediment collector 35 collects any debris or rocks that are pulled into the vacuum tank 1 via the vacuum tank inlet 8.

Figure 4:
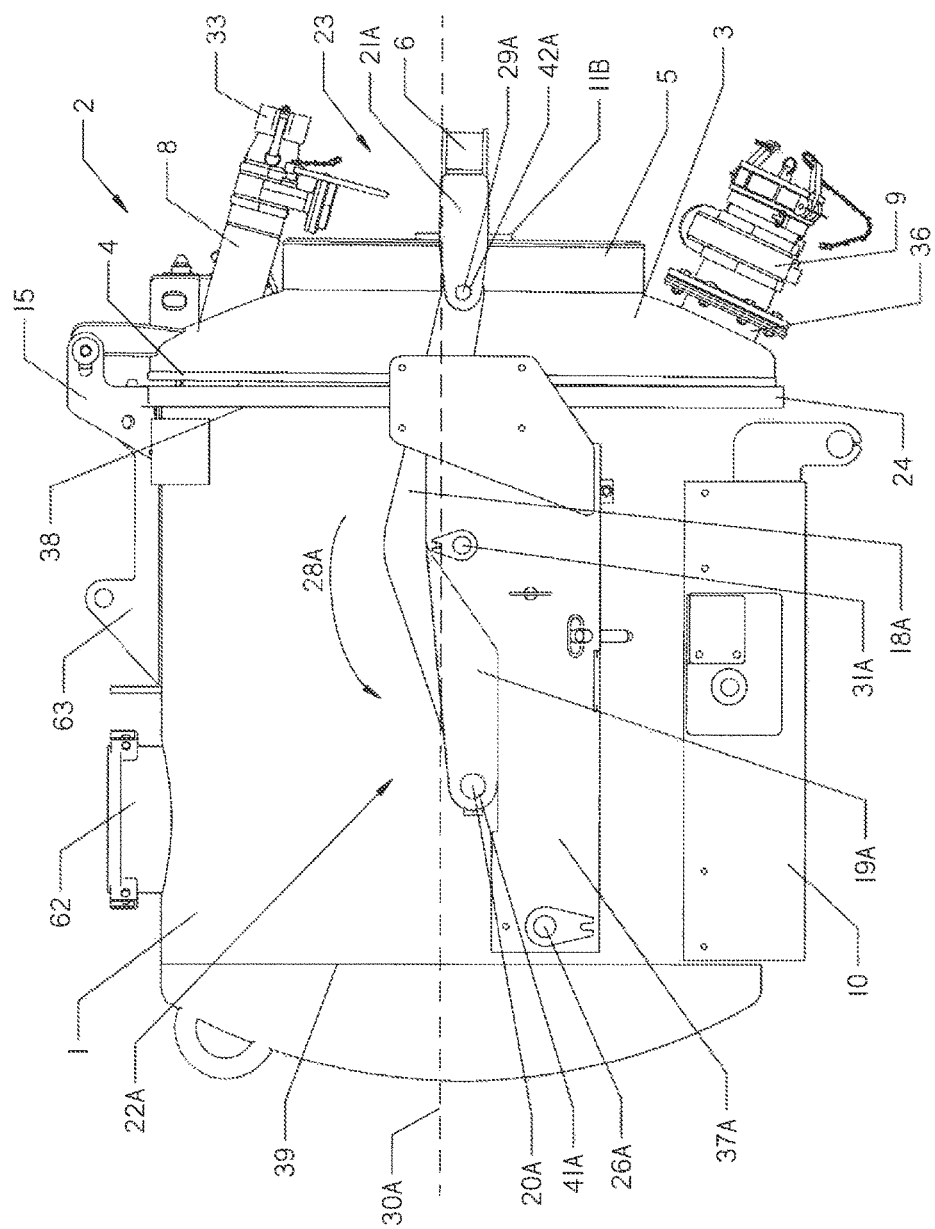
FIG. 4 is a side view of the vacuum tank with the tank door closed. The vacuum tank is shown resting on a mounting bracket and the door lifting assembly is shown in its compacted position to cause the door to close the tank.

FIG. 4 represents another side diagrammatical view of the vacuum tank 1 with the vacuum tank door 2 sealed closed. This view shows the same side shown in FIGS. 1 and 2. However, in FIG. 4 a guard bracket 37A is shown. The cylinder 16A and piston 17A are not shown in FIG. 4 because they are positioned behind the guard bracket 37A. The guard bracket 37A is used to support and protect various components of the lifting assembly. An identical guard bracket 37B is shown on the opposite side of the vacuum tank in FIG. 5 . FIG. 4 also shows the shut off lid 62 utilized to stop suction within the tank with the tank is full. A cylinder plate 63 is also shown at the top of the tank.

Turning to FIG. 5, the opposite side of the tank shown in FIGS. 1, 2 and 4 is shown. The lifting assembly 22B shown is identical to the lifting assembly 22A shown in FIGS. 1, 2, and 4. Cylinder 16B and piston 16B are not shown; rather, the guard bracket 37B they are disposed behind is shown. As in FIG. 4, pivot pin 20B is shown over-center below the horizontal line 30B.

The above described embodiments of the lifting assemblies 22A and 22B and the sealing mechanism 23 provide several advantages. First, rotating the lower linkage arm 19A and 19B over-center maximizes the amount of sealing force exerted by the horizontal crossbar 6 upon the tank door 2. Second, placing the lower linkage arms in the over-center position biases the door in the closed position. Third, the ability of the linkage arms 18A, 18B, 19A, and 19B to fully extend allows the tank door 2 to open widely making the interior of the vacuum tank 1 easily accessible.

Finally, connecting the horizontal crossbar 6 in two different places to the circular flange 5 by brackets 11A, 11B, 32A, and 32B, ensures that the horizontal crossbar 6 exerts a balanced force on the tank door 2. This reduces the likelihood of dimpling or deforming of the tank door 2 that would compromise the door's seal. Further, connecting the horizontal crossbar 6 in two places to the tank door 2 provides for an even seal around the circumference of the tank door 2.

Turning now to FIG. 10, an alternative vacuum system 64 is shown. The vacuum system 64 comprises a previously described vacuum tank 1 and a door 66. The tank 1 has a first end 38 and a second end 39. The first end 38 is open-ended and comprises a sealing flange 24 adapted to mate with the tank door 66 when the door is in the closed position. The second end 39 of the vacuum tank 1 is closed at all times and may comprise a dome-shaped circular member 68 welded to the second end. The vacuum tank 1 may be mounted onto a trailer not shown) or a motorized vehicle such as a truck.

Brackets 70 may be connected to the second end 39 of the tank 1 and used to connect optional components such as a hydraulically actuated vacuum hose boom (not shown). A flange 72 disposed near the second end 39 is configured for connection to an air pump (not shown) used to create a vacuum in the tank. A second flange member 74 may be used when the optional boom is used to connect a vacuum hose used to collect material into the tank.

The tank door 66 is connected to the top of the vacuum tank 1 via a hinge 15. The hinge 15 allows pivotal movement of the door relative to the vacuum tank. A hinge bracket 76 is connected to the top of the tank 1 at a second end 38 and may comprise a slot 76 that allows the door 66 to move slightly toward and away from the second end of the tank 1. The door 66 has two hinge brackets 78 connected by a cross-bar 80. Cross-bar 80 is disposed within the slots 76.

The tank 1 is supported on mounting bracket 10, Mounting bracket 10 is adapted to pivotally connect the tank to a trailer or truck so that the tank may be pivoted about pivot point 82 to permit dumping of the contents of the tank when the door is open. The hydraulic lifting assembly 50 (FIG. 5) may be used to till the vacuum tank as previously described herein.

In FIG. 10 the door 66 is shown in the closed and sealed position. The external components of a sealing mechanism 84 for sealing the tank 1 are shown. The sealing mechanism 84 pulls the door 66 toward the tank 1 at the periphery of the door to distribute the closing force applied by the door to the tank substantially equally around the flange 24 of the tank without the need for the application of a closing force at the center of the door 66. The sealing mechanism 84 comprises the circular door 66 having an outer surface. A first bracket 86 and a second bracket 88 are both connected to the outer surface of the door 66. A first linkage assembly 90 is connected to the first bracket 86 and a second linkage assembly 92 (partially shown in FIG. 10) is connected to the second bracket 88. A first actuator 94 is connected to the first linkage assembly 90 and a second actuator (not shown) is connected to the second linkage assembly 92. The first and second actuators are connected together to operate jointly to cause the first linkage assembly 90 and the second linkage assembly 92 to open or close the door in relation to the tank 1.

The door 66 is generally circular and dome shaped having an apex at its center. The outer periphery region of the door 66 terminates at an edge 96 formed to engage the flange 24 of the tank 1. A material level indicator comprising a sight glass 98 is disposed at the center/apex of the door 66 and permits an operator to visually inspect the interior of the tank when the door is closed. A second sight glass 100 is disposed directly above the sight glass 98 and gives the operator a visual indication that the material level inside the tank is nearing full when material appears in the second sight glass. A mounting bracket 102 is disposed directly above the second sight glass 100 and may be adapted to support lights (not shown).

As discussed above, a flange 36 is shown on the outer surface and toward the bottom of the door. The flange 36 surrounds an opening in the door and supports a gate valve 9. Gate valve 9 allows for the removal of material and fluids from the tank without requiring the door to be opened. An inlet 104 may be positioned on the door 66 just above the sight glass 98. The inlet 104 is connectable to a vacuum hose and digging tool. A vacuum air stream may be pulled through the inlet 104 when the optional boom arrangement is not used. As shown in FIG. 10, the inlet 104 is closed off with a plug 106 threaded onto the end of inlet. Valve handles 108 may be used to open and close the inlet 104 and the gate valve 9.

The first and second brackets 86 and 88 are connected to the outer surface of the door 66. The first and second brackets 86 and 88 may be connected to the door 66 on opposite sides of the center/apex of the dome shaped door, near the periphery of the door, and an equal distance from the center. The first bracket 86 comprises a first horizontal bar 110 connected to the door using a mount 111 and comprises a pivotal connection 112 with the first linkage 90. The second bracket 88 likewise comprises a second horizontal bar 114 connected to the door with a mount 115 and comprises a pivotal connection 116 with the second linkage 92. The horizontal bars 110 and 114 each support a bar linkage arm 118 that connects the first and second brackets 86 and 88 to the first linkage assembly 90 and second linkage assembly 92, respectively, using a pivot pin.

The first linkage assembly 90 is similar to the linkage assembly described with reference to FIG. 1. Linkage assembly 90 comprises an upper linkage arm 18A that is pivotally connected to the bar linkage arm 118 at a first end and pivotally connected to a lower linkage arm 120 at a pivot point 122 disposed at a second end of the upper linkage arm. The lower linkage arm 120 is connected to the upper linkage arm 18A at first end and pivotally connected to the actuator 94 at a pivot point 124 disposed at a second end of the lower linkage arm. The lower linkage arm 120 may comprise a first wall 126 and a second wall 128 that form a slot 130 for housing a portion of the upper linkage arm 18A when the door 66 is in the closed position. The lower linkage arm 120 is pivotally connected to the tank 1 at connection point 132 disposed between the first end of the lower linkage arm and the second end of the lower linkage arm. The connection point comprises a stub 134 that is welded to the tank 1 and disposed within a circular opening in both the first wall 126 and the second wall 128. A locking pin 136 may be placed within corresponding holes in the upper linkage arm 18A to lock the linkage assembly when the door is in the opened position. One skilled in the art will appreciate that the lower linkage arms disclosed with reference to FIGS. 1-9 may be used with the vacuum system shown in FIG. 10.

Actuator 94 is similar to the hydraulic actuator 16A disclosed in reference to FIG. 1 and operates in the same way to drive operation of the linkage assembly 90. A second actuator (not shown) may be disposed on the opposite side of the tank 1 and used to drive operation of the second linkage assembly 92. A distributor 138 may connect the first and second actuators so that they operate jointly to cause the first linkage assembly 90 and the second linkage assembly 92 to open or close the door as previously discussed herein.

Turning now to FIG. 11, a front view of the door 66 of FIG. 10 is shown. FIG. 11 illustrates the position of the first bracket 86 and the second bracket 88 on the diameter 140 of the door 66 and at a position proximate the periphery of the door. The first and second brackets 86 and 88 are both positioned such that the mounts 111 and 115 and horizontal bars 110 and 114 are positioned beyond the midpoint of a radius of the door and equidistant from the apex/center of the door. FIG. 11 also shows the material level indicator 98 disposed e the center point of the door and the collection tank inlet 104 positioned just above the sight glass 98. The location of the first and second brackets 86 and 88 is advantageous because it allows for the positioning of sight glass 98 at the center of the door. Additionally, first and second brackets 86 and 88 reduce the overall weight of the vacuum system, eliminate the need to weld a cross-bar to the door or have a cross bar as disclosed herein, yet still provides substantially uniform closing force about the periphery of the door and tank.

When a vacuum is produced in vacuum tank 1, a vacuum air stream may be pulled through the vacuum tank inlet 104. When inlet 104 is not closed off by a plug 106, the inlet may be connected to a hose (not shown) leading to digging tools (not shown), One skilled in the art will also recognize that the vacuum tank inlet 104 may also be placed on either side of the vacuum tank 1. As previously discussed, placing the vacuum tank inlet 104 on the tank door 66 may provide for less expensive repair of the inlet 104 by only having to replace or repair the tank door rather than the entire vacuum tank. FIG. 11 also shows the second sight glass 100 on the tank door. The mounting bracket 102 for lights and the hinge 15 are also shown in FIG. 11.

FIG. 11 shows the first linkage assembly 90 on a first side of the door and the second linkage assembly 92 on a second side of the door 66. The upper linkage arms 18A and 18B are shown disposed within the slot 130 formed by the lower linkage arms 120A and 120B, Actuators 94A and 94B are connected to the lower linkage arms 120A and 120B at connection points 124A and 124B. Distributors 138A and 138B are connected to the actuators 94A and 94B to control the distribution of hydraulic fluid to the actuators.

Turning now to FIG. 12 the inner surface 142 of the door 66 is shown. A first brace 144 is connected to the inner surface of the door and spaced apart from the diameter 140 of the door. As shown in FIG. 12, the first brace is disposed above the diameter 140 of the door. A second brace 146 is also connected to the inner surface 142 and disposed orthogonally relative to the first brace 144 to cross the first brace. A third brace 148 is connected to the inner surface 142 and disposed parallel to the first brace 144.

In the configuration of FIG. 12, the first brace 144 is disposed on a first side of (above) the center point and diameter 140 of the door while the third brace 148 is disposed on a second side of (below) the diameter 140 and center point of the door. The first brace 144 and the third brace 148 may be connected to the door so that they are parallel to the diameter 140.

A fourth brace 150 is connected to the inner surface 142 and disposed parallel to the second brace 146. Each of the first, second, third, and fourth braces (144, 146, 148, and 150) are spaced apart from the center of the door. The first brace 144 and the third brace 148 may comprise a plurality of pieces connected to the inner surface 142 of the door 66. Each of the first, second, third, and fourth braces may comprise a first curved side 152 that follows the curvature of the dome-shaped door 66 and a second flat side 154. Preferably, the flat side 154 may comprise a bent edge.

The braces disclosed herein provide the door with structural support when under vacuum pressure and assist in evenly distributing the closing force applied by the first linkage assembly and the second linkage assembly about the periphery of the tank opening.

It should be appreciated by those skilled in the art that various modifications and variations can be made in the present invention without departing from the scope and spirit of the invention. It is intended that the present invention cover such modifications and variations as come within the scope and spirit of the appended claims and their equivalents.

The invention claimed is:

1. A door assembly comprising:
   a dome-shaped door having an inner surface, an outer surface, a cylindrical base, an apex and a central axis that extends through the apex in an orthogonal relationship to the base;
   a first brace engaging the inner surface and joining opposed portions of the base;
   a second brace engaging the inner surface and joining opposed portions of the base, in which the second brace is orthogonally disposed relative to the first brace;
   a third brace engaging the inner surface and joining opposed portions of the base, in which the third brace is parallel to the first brace;
   a fourth brace engaging the inner surface and joining opposed portions of the base, in which the fourth brace is parallel to the second brace; and
   a plurality of brackets connected to the outer surface of the door at points equidistant from the central axis, the brackets being operatively connectable to a door movement assembly.

2. The door assembly of claim 1 in which the outer surface of the door is convex and the inner surface of the door is concave.

3. The door assembly of claim 2 in which each of the first brace, the second brace, the third brace, and the fourth brace is sized to fit flush against the concave inner surface of the door.

4. The door assembly of claim 1 in which the first and third braces are each disposed on opposite sides of a diameter of the door.

5. The door assembly of claim 1 in which the first brace, the second brace, the third brace, and the fourth brace are each fully contained within the door.

6. The door assembly of claim 1 in which each of the first brace, the second brace, the third brace, and the fourth brace is formed from multiple pieces.

7. The door assembly of claim 1 in which the base extends between an upper and lower end, and in which each of the first brace, the second brace, the third brace, and the fourth brace has a terminal edge contained within the base and spaced from the lower end.

8. The door assembly of claim 1 in which each of the first brace, the second brace, the third brace, and the fourth brace has a first curved side and an opposite second flat side, in which the first curved side engages the inner surface of the door.

9. The door assembly of claim 1 in which the door movement assembly comprises a first linkage assembly connected to a first actuator, and a second linkage assembly connected to a second actuator.

10. The door assembly of claim 9 in which one of the plurality of brackets is attached to the first linkage assembly and one of the plurality of brackets is attached to the second linkage assembly.

11. The door assembly of claim 9 in which the first and second actuators operate jointly to cause the first linkage assembly and the second linkage assembly to open and close the door.

12. The door assembly of claim 1 in which the plurality of brackets comprise a first bracket connected to the outer surface at the periphery of the door and a second bracket connected to the outer surface at the periphery of the door.

13. The door assembly of claim 12 in which the first bracket comprises a first horizontal bar having a pivotal connection with the door movement assembly.

14. The door assembly of claim 13 in which the second bracket comprises a second horizontal bar having a pivotal connection with the door movement assembly.

15. The door assembly of claim 1 in which each of the first brace, the second brace, the third brace, and the fourth brace are all spaced apart from a center of the door.

16. The door assembly of claim 1 in which each of the first brace, the second brace, the third brace, and the fourth brace extend within the base along a non-diametrical chord of a circle defining the cross-sectional profile of the base.

17. A vacuum system comprising:
a tank having an open end and a closed end; and
the door assembly of claim 1 attached to the open end of the tank.

18. The vacuum system of claim 17 in which the tank is supported on a trailer.

19. The vacuum system of claim 17 in which the base has a lower end contained within a plane that is perpendicular to a ground surface when the door is in a closed position.

20. The vacuum system of claim 17 in which the base has a lower end contained within a plane that is parallel to a ground surface when the door is in a fully opened position.

* * * * *

UNITED STATES PATENT AND TRADEMARK OFFICE
CERTIFICATE OF CORRECTION

PATENT NO. : 10,207,863 B2  
APPLICATION NO. : 15/810647  
DATED : February 19, 2019  
INVENTOR(S) : Sewell et al.

Page 1 of 1

It is certified that error appears in the above-identified patent and that said Letters Patent is hereby corrected as shown below:

On the Title Page

Item (56), page 2, under "References Cited" please delete "1,237,290" and substitute therefore "1,287,290".

In the Specification

Column 1, Line 65, after "point" please insert --.--.
Column 2, Line 64, after "FIG" please delete "," and substitute therefore ".".
Column 4, Line 7, please delete "arid" and substitute therefore "and".
Column 4, Line 9, after "12B" please delete "," and substitute therefore ".".
Column 4, Line 18, please delete "arid" and substitute therefore "and".
Column 4, Line 62, after "19A" please delete ", Tire" and substitute therefore ". The".
Column 5, Line 11, after "27" please delete "," and substitute therefore "."
Column 5, Line 66, after "5" please delete "," and substitute therefore ".".
Column 6, Line 2, please delete "riot" and substitute therefore "not".
Column 7, Line 4, after the word "trailer" please insert --(--.
Column 7, Line 26, please delete "till" and substitute therefore "tilt".
Column 8, Line 64, please delete "e" and substitute therefore "at".
Column 9, Line 11, after the closed ")" please delete "," and substitute therefore ".".
Column 9, Line 25, after "120B" please delete "," and substitute therefore ".".

Signed and Sealed this  
Sixteenth Day of April, 2019

Andrei Iancu  
*Director of the United States Patent and Trademark Office*